Dec. 3, 1929.    J. A. ROLLINS    1,738,448
ANIMAL TRAP
Filed Aug. 31, 1928
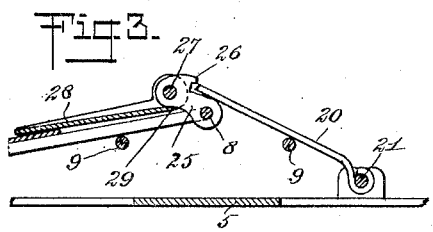
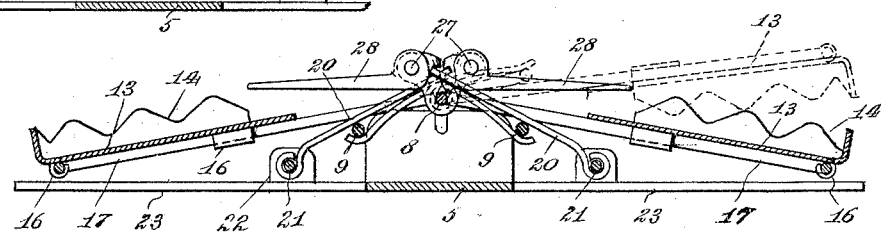
WITNESSES
INVENTOR
James A. Rollins
BY
ATTORNEY Patented Dec. 3, 1929

1,738,448

UNITED STATES PATENT OFFICE

JAMES A. ROLLINS, OF DENISON, IOWA

ANIMAL TRAP

Application filed August 31, 1928. Serial No. 303,343.

This invention relates to animal traps, and has particular reference to an improvement upon traps of the spring jaw trigger release type.

The invention primarily contemplates a trigger released spring jaw trap which is provided with independent trigger releasable means for holding the jaws in opened set relation whereby to render the same more positive and effectual in use.

The invention further aims to provide an improved animal trap which includes a base and a pair of jaws fulcrumed thereto having means for normally moving the jaws to a closed trapping relation, together with separate means for holding each jaw in its opened set condition and a trigger for each jaw to afford means for independently releasing each of said jaws whereby the trap may be sprung from either side.

Other objects of the invention reside in the comparative simplicity of construction and mode of operation of the trap, the economy with which the same may be produced, the ease with which the same may be set and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a plan view of the trap in opened set condition.

Figure 2 is a sectional view therethrough taken approximately on the line indicated at 2—2 in Figure 1, and illustrating in dotted lines the sprung condition of the trap.

Figure 3 is a fragmentary detail sectional view taken approximately on the line 3—3 of Figure 1, illustrating the trigger moved to a position for releasing the trap jaw.

Figure 4 is a detail fragmentary sectional view taken approximately on the line 4—4 of Figure 1, illustrating the spring for actuating the trap jaw yokes.

Referring to the drawings by characters of reference, the trap includes a substantially cruciform base 5 having diametrically disposed upturned terminals 6 on the transverse arms 7 of the base, which terminals constitute bearings for the transverse shaft or cross rod 8. A pair of yokes 9 of substantially U-shaped configuration are fulcrumed on the transverse shaft or cross rod 8, and said yokes are designed to be normally swung toward each other and tensioned against relative swinging movement away from each other by virtue of coiled springs 10, the end convolutions 11 and 12 of which extend tangentially from the coil and engage with the bight of the opposite yokes 9. Two of said springs are preferably employed and the same are spaced transversely apart with the coiled portions surrounding the transverse shaft or cross rod 8. The trap jaws may be made in any desired manner, but as illustrated, each jaw comprises a plate 13 having a serrated marginal flange 14 which is attached to a U-shaped frame 15 by means of tongues 16 coiled about the frame. Portions of the frame arms 17 extend beyond the inner unflanged edge of the plate 13 and are provided with eyes 19 which surround the transverse shaft or cross rod 8. This, obviously, fulcrums the jaws to the base. The bight portions of the yokes 9 underlie the arms 17, and due to the spring tension exerted on the yokes, it is obvious that the trap jaws are normally caused to be moved toward each other to a closed trapping relation.

The trigger releasable means for holding the jaws in open relation comprises a pair of detent arms 20, one serving for each of the jaws. The detent arms 20 are respectively fulcrumed at 21 to bearing ears 22 on the longitudinal arms 23 of the base. Latches 25 are fulcrumed on the transverse shaft or cross rod 8, and said latches are provided with hooked terminals 26 which are designed to engage the free terminal of the detent arms 20 after said detent arms are engaged over the yokes for the swinging of same to an open position. The free end of each latch 25 has fulcrumed thereto at 27 a trigger 28, and the trigger adjacent its fulcrumed end is provided with a shoulder 29 which is designed to coact with the latch 25 in the nature of a rule-joint for moving the latch to a released position when the trigger is depressed whereby to spring the trap. It will be observed that the triggers project in opposite directions when the trap is set so that the trap may be sprung by the animal from either side. If the right-hand trigger as viewed in Figures 1 and 2 is operated, the left-hand jaw will be released and will swing over to a closed trapping relation with respect to the right-hand jaw while said right-hand jaw remains in a stationary position. On the other hand, if the left-hand trigger is sprung, the right-hand jaw moves over onto the left-hand jaw. In order to properly space the springs 10 and the latches 25, a spacing sleeve 30 surrounding the transverse shaft or cross rod 8 is interposed between the latches 25.

From the foregoing, it will thus be seen that an improved animal trap has been devised which includes separate means for holding each one of a pair of jaws in an open set condition while an independent trigger for independently releasing each of said jaw holding means has been devised, the triggers being disposed in opposite directions to insure a proper springing of the trap irrespective of the direction from which the animal approaches the same.

What is claimed is:

1. A trap comprising a pivoted jaw, a yoke having a spring to press it against a part of the jaw, a pivoted detent arm, a pivoted latch having a hooked terminal receiving the end of said arm and held thereagainst by the tension of said spring, and a trigger fulcrumed on the latch having a shoulder bearing against the latch and constituting a rule-joint.

2. A trap comprising a shaft, a jaw pivoted thereon, a yoke pivoted on the shaft and having a spring to press it against a part of the jaw, a pivoted detent arm, a latch pivoted on the shaft and having a hooked terminal receiving the end of the arm, and a trigger fulcrumed on the latch having a shoulder bearing on the latch to form a rule-joint and being depressible to release said terminal from the arm to permit closing of the jaw.

3. A trap comprising a base with a shaft, a pair of jaws pivoted on the shaft, a pair of yokes pivoted on the shaft and having springs for pressing the respective yokes against parts of the jaws, detent arms pivoted on the base and crossing the yokes and shaft when the trap is open, a pair of latches pivoted on the shaft and having hooked terminals oppositely directed to receive the ends of said arms for holding the trap open, and a trigger fulcrumed on each latch having a shoulder bearing on the respective latch to compose a rule-joint and support the trigger in a set position.

JAMES A. ROLLINS.